Feb. 12, 1952  J. W. ROSENDAHL  2,585,174
SERVING DISH FOR CORN ON THE COB
Filed May 26, 1949
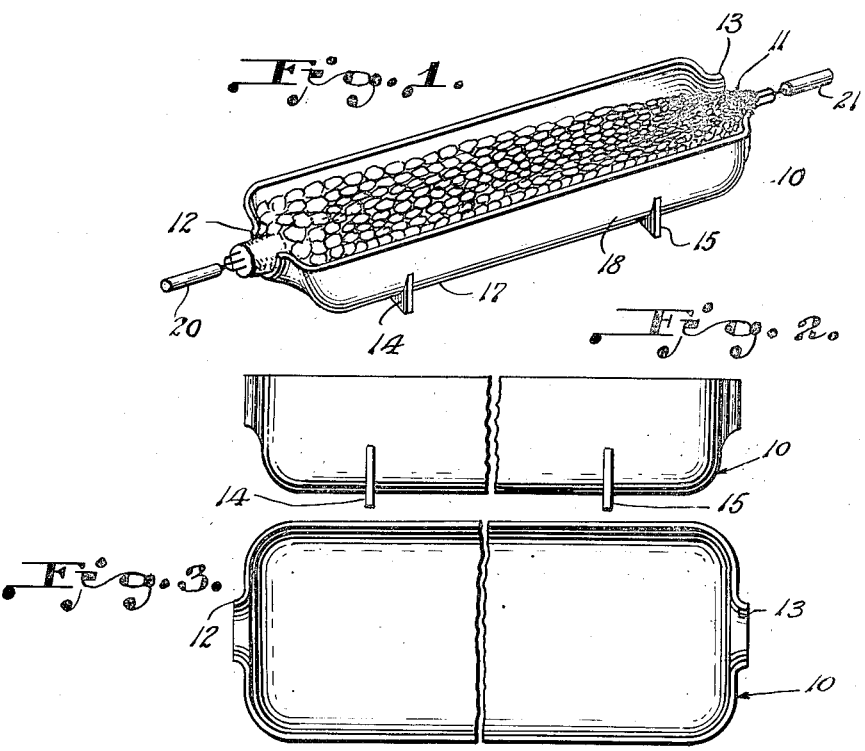
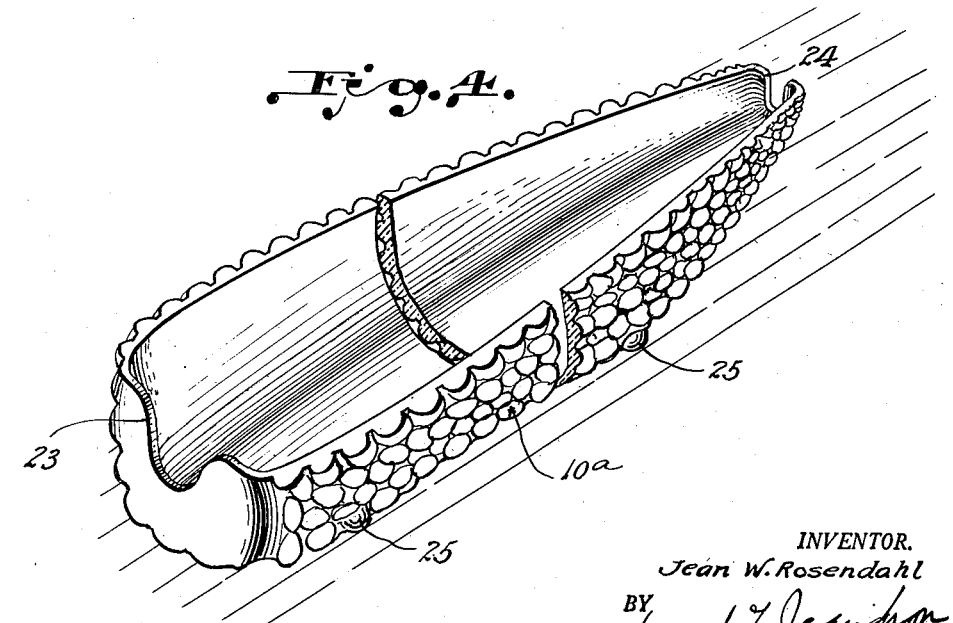
INVENTOR.
Jean W. Rosendahl
BY
ATTORNEY.

Patented Feb. 12, 1952

2,585,174

UNITED STATES PATENT OFFICE 2,585,174

SERVING DISH FOR CORN ON THE COB

Jean W. Rosendahl, Toms River, N. J.

Application May 26, 1949, Serial No. 95,420

3 Claims. (Cl. 65—15)

This invention relates to a serving dish and more particularly to a dish for corn on the cob.

In the serving of corn on the cob, it has been customary to provide a knife and butter to properly coat and prepare the corn for eating which requires a serving plate to support the corn and retain the melted butter. Another utensil that has been found to be of assistance is a pair of corn spears or forks that are inserted into either end of the ear of corn so that the melted butter will not run down the hand of the party eating same. All of these past processes have been found to be untidy.

It is an object of this invention to provide an improved dish for serving corn on the cob which is particularly adapted to this purpose to provide a tidy dish that supports the corn on the cob properly and retains the butter and melted butter within the dish yet permits spreading the butter over the area of the corn on the cob.

A further object of this invention is to provide a serving dish for corn on the cob into which an ear of corn may be placed and butter or melted butter may be added and by rotating the ear of corn within the dish the corn is prepared for eating.

A still further object of this invention is to provide serving dishes for corn on the cob that are so formed that a plurality of these dishes may be packed in a nested relationship in a minimum amount of space and with a great deal of stability as nested.

Further objects of this invention shall be apparent by reference to the detailed description and the accompanying drawings in which Fig. 1 illustrates a perspective view of the serving dish supporting an ear of corn, Fig. 2 is a side elevational view of the serving dish, Fig. 3 is a plan view of the serving dish, and Fig. 4 is a perspective view of another embodiment of the serving dish.

Referring to Fig. 1, there is illustrated a serving dish 10 that is used to support and serve an ear of corn 11. The dish is generally round in shape and is provided at either end thereof with a half round cutout portion 12 and 13. The dish may be provided with a pair of supporting legs 14 and 15 to give the dish stability. The general use of the dish 10 is apparent by reference to Fig. 1; with an ear of corn 11 mounted in the dish 10 the party about to eat the corn may apply butter directly to the corn or he may pour melted butter and seasoning into the dish 10. The dish will retain the butter and the corn may be rotated by manipulating either end of the ear of corn to turn the corn as it rests within the half round cutout portions 12 and 13. Thus the corn is nicely coated with butter and may be eaten as desired. A pair of corn holding forks 20 and 21 may be used to both rotate and to pick up the corn if it is desired.

Referring to Fig. 4 there is illustrated another embodiment of the serving dish 10A which in addition to supporting an ear of corn similar to the dish 10 of Fig. 1 is provided with an exterior decorative motif 25 to simulate the general appearance of an ear of corn. The similarity may or may not be carried to an exact formation by tapering the dish toward one end to shape the dish similar to an ear of corn. Thus the dish when not in use still suggests the intended use for the dish. Due to the irregular exterior formation in copying an ear of corn, the rows of kernels of corn may be so shaped or emphasized to provide a stable supporting structure so that the dish will set squarely and not tip in use. This particular embodiment may also be provided with four or more supporting legs and in such embodiment the legs would preferably take the form of a kernel of corn. Either embodiment may in addition be colored to reproduce the color schemes of an ear of corn.

Various changes or modifications may be made to the serving dish illustrated without departing from the spirit of this invention and this invention shall be limited only by the appended claims.

What is claimed is:

1. A dish for serving corn on the cob comprising a body, the general exterior surface of which has the appearance of an ear of corn, said body having a half round transverse cross section throughout its length, one end wall formed with a semi-circular support and opening, said end wall joined to said body by a concave area merging into said body, but said body tapering from immediately adjacent said end wall to the opposite end of the dish, forming thereat the other end of the dish which is provided with a support and opening substantially of the same area as the opening provided in said end wall at the other end of the dish, said other end of the dish merging into the body of the dish with a concave portion, said exterior surface so formed that the lower portion provides a plurality of level points of support to support said dish in a level position, said semi-circular supports adapted to support an ear of corn in said dish in position to permit rotating said corn.

2. A dish for serving corn on the cob comprising a body, the general exterior surface of which has the appearance of an ear of corn with a plurality of kernels, said body having a half round transverse cross section throughout its length, one end wall formed with a semi-circular support and opening, said end wall joined to said body by a concave area merging into said body, but said body tapering from immediately adjacent said end wall to the opposite end of the dish, forming thereat the other end of the dish which is provided with a support and opening substantially of the same area as the opening provided in said end wall at the other end of the dish, said other end of the dish merging into the body of the dish with a concave portion, said exterior surface so formed that a plurality of said kernels project as supporting legs to support said dish in a level position, said semi-circular supports being concentric and wide enough to support an ear of corn in said dish in position to permit rotating said corn.

3. A dish for serving corn on the cob comprising a body having a substantially half round form at any transverse cross section, the ends of said body formed with semi-circular concentric openings that are in alignment with each other, said body of the serving dish having legs to support said dish, each opening having a substantial bearing surface for the end of the ear of corn and each opening being of sufficient size to receive the end of the ear of corn directly thereon, thus permitting manual rotation of an ear of corn when supported therein.

JEAN W. ROSENDAHL.

REFERENCES CITED

The following references are of record in the file of this patent:

UNITED STATES PATENTS

| Number | Name | Date |
|---|---|---|
| D. 70,865 | Taudte | Aug. 17, 1926 |
| D. 86,948 | Berry | May 17, 1932 |
| D. 111,254 | Gugenheim | Sept. 13, 1938 |
| D. 129,479 | Haus | Sept. 16, 1941 |
| D. 160,164 | Graham | Sept. 19, 1950 |
| 879,559 | Lee | Feb., 18, 1908 |
| 889,434 | Bustanoby | June 2, 1908 |
| 1,579,911 | Berry | Apr. 6, 1926 |
| 1,799,155 | Brown | Apr. 7, 1931 |